US008112325B2

(12) United States Patent
Foy et al.

(10) Patent No.: US 8,112,325 B2
(45) Date of Patent: Feb. 7, 2012

(54) METHOD AND APPARATUS FOR AUTOMATICALLY CAPTURING MULTIPLE IMAGES OF MOTOR VEHICLES AND OTHER ITEMS FOR SALE OR AUCTION

(75) Inventors: Donald Foy, Atlanta, GA (US); Charles Copeland, Alpharetta, GA (US); Troy Dawson, Conyers, GA (US); Tom McElroy, Cumming, GA (US); Bob Pruett, Morrow, GA (US)

(73) Assignee: Manheim Investments, Inc., Las Vegas, NV (US)

( * ) Notice: Subject to any disclaimer, the term of this patent is extended or adjusted under 35 U.S.C. 154(b) by 1582 days.

(21) Appl. No.: 11/226,463

(22) Filed: Sep. 15, 2005

(65) Prior Publication Data

US 2007/0057815 A1    Mar. 15, 2007

(51) Int. Cl.
*G06Q 30/00* (2006.01)
(52) U.S. Cl. ...................................................... 705/27.2
(58) Field of Classification Search ...................... 705/35
See application file for complete search history.

(56) References Cited

U.S. PATENT DOCUMENTS

| 4,941,182 | A | 7/1990 | Patel |
|---|---|---|---|
| 5,493,490 | A | 2/1996 | Johnson |
| 5,767,505 | A | 6/1998 | Mertens et al. |
| 6,965,324 | B1 | 11/2005 | Suggs, Sr. |
| 7,460,639 | B2 * | 12/2008 | Tudor et al. .................... 378/57 |
| 2002/0067408 | A1 | 6/2002 | Adair et al. |
| 2002/0118969 | A1 | 8/2002 | Kanade et al. |
| 2004/0189830 | A1 | 9/2004 | Pollard |
| 2005/0195216 | A1 | 9/2005 | Kramer et al. |
| 2006/0114531 | A1 | 6/2006 | Webb et al. |
| 2008/0123809 | A1 * | 5/2008 | Tudor et al. ..................... 378/57 |

FOREIGN PATENT DOCUMENTS

| EP | 1289317 A1 | 5/2003 |
|---|---|---|
| EP | 1429543 A2 | 6/2004 |
| JP | 01-232315 A | 9/1989 |
| JP | 2000-029099 A | 1/2000 |
| JP | 2003-162653 A | 6/2003 |

OTHER PUBLICATIONS

International Search Report and Written Opinion of the International Searching Authority (Aug. 17, 2007).
Manheim's Image Capture Station Screen Shots (1998).
Manheim Image Capture Station Operation Procedure and Equipment Checklist (1998).
Extended Search Report issued in corresponding European patent application No. 06 740 266.9-1248 (Dec. 15, 2009).
Office Action Issued in Japanese Patent Application No. 2008-531079 with Translation (Jul. 26, 2011).

\* cited by examiner

*Primary Examiner* — Jason Dunham
*Assistant Examiner* — Leland Marcus
(74) *Attorney, Agent, or Firm* — Nixon & Vanderhye PC

(57) ABSTRACT

An automatic "photo booth" for capturing images of objects including but not limited to motor vehicles provides consistent and rapid image capture from multiple viewpoints. Ultrasonic sensors or other positional sensing devices are used to both position the object with the photo booth enclosure and calculate field of view parameters controlling digital cameras to provide appropriate image scaling/cropping at time of image capture. The enclosure provides automatic entry/exit door opening/closure and a controlled interior space to provide a controlled environment for image capture. Captured images may be rapidly uploaded to a server for electronic distribution over the World Wide Web or other appropriate network.

16 Claims, 16 Drawing Sheets

Example Block Diagram

Example Vehicle Tracking Display

Example Vehicle Tracking Display

Example Image Capture Display Screen

Example Image Capture Approval Screen

*Example Handheld Unit Work Order Input Screen*

Example Work Order Input

Example Camera Settings Screen

Example Advanced Camera Settings Screen

Example Camera Error Message

METHOD AND APPARATUS FOR AUTOMATICALLY CAPTURING MULTIPLE IMAGES OF MOTOR VEHICLES AND OTHER ITEMS FOR SALE OR AUCTION

FIELD

The technology herein relates to automatic computer-controlled image capture, and more particularly to automatic capture of photographic images for documenting items including but not limited to motor vehicles, boats, motorcycles and other items for auction or sale.

BACKGROUND AND SUMMARY

The Internet has fundamentally changed the way many items are sold. Not so long ago, dealers of items such as motor vehicles acquired motor vehicles for sale by physically attending the sale or auction and bidding on the items they wished to purchase for their own inventory. Physical presence allowed the dealers to inspect the items thoroughly before purchase or bidding. The dealers or their representatives could literally or figuratively "kick the tires", observe damage such as dented fenders or cracked windshields, and make a fairly accurate determination of what would be necessary to repair or refurbish the item to maximize resale value.

Now, many motor vehicles and other items are sold over the Internet. Instead of physically traveling to the site of items for sale, it is now increasingly more common for dealers and other potential purchasers to view information about the items over the Internet or other network connection having computer or other display equipment, and then place bids or purchase orders electronically. Such remote purchasing creates a demand for full and accurate electronic, remotely-viewable documentation of the items for sale. While written descriptions and condition reports of used items for sale can be useful and informative, at least some prospective purchasers wonder whether the written descriptions tell the whole story. In addition, writing detailed condition reports is fairly time consuming.

Anyone who has ever been disappointed by a purchase by mail order or on EBay will understand that more information is better—especially for high ticket items such as motor vehicles, boats, motorcycles, real estate, motor homes and other relatively expensive items. Photographs are now absolutely essential as providing full documentation of relatively expensive items for sale. Looking any any vehicle auction site such as autotrader.com or ebay.com, one finds sellers posting fairly extensive set of photos of their vehicles for sale. Sellers often try to photograph their vehicle from all sides as well as providing photos of the interior. Some sellers also photograph the engine and other parts of the vehicle that are damaged (e.g., rust spots, dents, etc.) to give the buyer a full understanding of the condition of the vehicle. The sellers do this because they have found that buyers are more likely to purchase cars they have never physically inspected if the buyers can view sufficient photos to get a complete understanding of the condition of the vehicle.

For this reason, it is now common for written condition reports to be accompanied by one or more photographs of the new or used item being offered for sale or auction. While photographs can be altered, if a trusted party takes the photographs, the prospective buyer can have a fairly degree of confidence that the photographs accurately document the condition of the item.

While it is fairly straightforward for a good photographer to fully document the condition of any new or used motor vehicle or other item, this process can be time intensive and therefore expensive. Anyone who has ever attended a vehicle auction knows that often there are many vehicles placed on the auction block and that the vehicles move very rapidly through the auction process. In the past, staff that collects condition reports would visit an auction or other site where motor vehicles were offered for sale in advance, and use a digital photographic camera to photograph each motor vehicle to be auctioned. The photographer would photograph each vehicle from a variety of different angles. In case of vehicles having damage or imperfections, the photographer might take special photographs documenting those particular areas of the vehicle or other item. The photographer often needed to work with an assistant whose job was to carefully take notes so that the appropriate photographs could be matched up with written condition reports. The photographs and written condition reports would then be used to create a presale catalog which could be online or offline. In the case of online documentation, the photographer would upload the set of photographs for each vehicle to a server or other computer for further distribution over the Internet or the other mechanism to prospective purchasers. Such a largely manual and time-intensive process often needed to be performed relatively rapidly to ensure that appropriate documentation would be made available to prospective purchasers in advance of the sale or auction. This largely manual process was therefore relatively expensive and sometimes inefficient—especially when a large number of vehicles needed to be photographed for a particular auction. Time constraints leading to sale day along with volume and efficiency are important factors.

From the perspective of prospective purchasers, complications or issues could arise when different vehicles or other goods were documented differently. For example, different photographers might take photographs from different angles. Different photographers might use different equipment with different image resolutions. Lighting conditions could change with the weather (especially for large items such as motor vehicles that are typically stored outdoors on an auction lot) to create even more non-uniformity. Often, the photographer would not move the vehicle to photograph it, and other extraneous objects (other vehicles, fences, etc.) would end up being included in the background of the photographs Such non-uniformities could be distracting and make it more difficult for a prospective purchaser to compare different items with one another to make a more fully informed purchasing decision—especially in the context of a fast-moving auction when a dealer or his representative typically spends only a few seconds making a purchasing decision and then moves on to the next vehicle. These inconsistencies were also objectionable to the selling party. Their goal being to present vehicles in the best possible light, poor images are a poor reflection on the product.

It would therefore be highly desirable to create and provide an automatic photographic documenting system and method capable of providing high resolution, uniform images of new and used items for purchase or auction quickly and cost-effectively.

Some of us have had our pictures taken in a photo booth at a shopping mall or a fair. Photo booths provide an enclosure which limits the camera's field of view and prevents other people and objects in a crowded environment from being included in the photos. Photo booths typically take a series of photos in rapid succession using artificial lighting (e.g., a flash lamp), and print out a strip of photos immediately. Some photo booths may provide captured images in digital form on digital media. While photo booths are fun to use, it is not apparent how one could adapt this technology to photograph large inanimate objects such as motor vehicles.

The technology herein succeeds by providing solutions that are advantageous, efficient and highly cost-effective. Exemplary illustrative non-limiting implementations are capable of fully documenting the motor vehicle external condition within a few seconds and automatically and rapidly uploading the resulting images to a server for immediate or prompt display and distribution to prospective purchasers. Automated naming is also a factor here.

One exemplary illustrative non-limiting implementation for particular use with new or used motor vehicles provides an enclosed "photo booth" structure with automatic doors at each end. The doors could be roll-down or other automated doors including for example non mechanical doors or other structures that block ambient light. A vehicle is driven up to the enclosed building. A bar code on the vehicle is read by a laser bar code reader or input manually and a computer-based operating system automatically, in response, populates a computer monitor screen with the vehicle information previously entered into the computer system during the condition report writing process. The vehicle is then driven into the enclosed building. Computer-based tracking technology automatically tracks the vehicle's position as it is driven into the building, and advises the driver where to stop the vehicle so it is centered within the building. For example, as the car is entering, the computer system projects on the wall of the far end of the booth directions to the driver instructing him when to stop the vehicle. These directions may be generated based upon tracking devices such as ultrasonic, laser or other tracking systems—for example one located at each end of the booth—that are programmed to measure the length of the car, the location of the car and which interface with the computer system to direct the car to stop in the precise location desired for each of multiple (e.g., six) cameras installed in the booth to take a picture of the vehicle in the correctly cropped format. In the exemplary illustrative non-limiting implementation, the cropping is achieved by controlling the cameras zoom function and zooming to the appropriate level.

When the driver stops the vehicle as directed, the system automatically closes roll-down doors to prevent ambient light from entering the enclosure and to eliminate extraneous objects outside the enclosure from the field of view. The system then sends zoom instructions to each camera (based on the vehicle dimension/configuration obtained from the vehicle tracking system) to provide correct field of view/ cropping parameters so each camera captures a nearly ideal image that does not need any post-processing or enhancement. The system then instructs the cameras to take photographs and each camera does so. Such photographs may be taken after dimming or extinguishing certain lights within the photo booth and using an automatic high intensity halogen (e.g., flash based) lighting system to achieve high contrast and uniformity and color corrected lighting. Because every vehicle is photographed by the same set of cameras (using appropriate zoom control based on the particular vehicle's dimensions) in an enclosure with appropriate light illuminating sources, the system achieves uniform lighting results each and every time. Furthermore, because an ultrasonic or other position tracking system reliably tracks vehicle positioning and controls camera operation, it is possible to ensure very uniform photographic images while accommodating objects of different lengths and dimensions (e.g., an SUV or town car have very different sizes and shapes as compared to more compact motor vehicles). Provision is also made for taking photos of the interior of the vehicle—and additional photos of other vehicle features and conditions in a human technician's discretion.

Once the photographs are captured and a human operator approves the results, the far door of the photo booth opens and the vehicle can be driven out of the booth. The pictures are then promptly or immediately uploaded onto a computer system, and can be promptly or immediately posted to an Internet web site for example, where the vehicle is offered or auctioned for sale.

Exemplary illustrative non-limiting implementations of the technology herein provide several advantages including for example:

consistent, high quality images,
    multiple images with correct field of view,
    no distracting objects in the background,
    appropriate high contrast and uniform lighting irrespective of outside ambient light conditions,
    simple interface not requiring highly trained employees,
    robust system that operates quickly and efficiently,
    capability of uploading images substantially simultaneously in the unified transmission in a short amount of time for correlation and identification of preexisting profile information,
    use of ultrasonics or other positional tracking technology to track object position and to ascertain and compensate for different object dimensions and configurations,
    automatic computer-controlled digital zoom control provides automatic cropping/field of view control at time of image capture to eliminate need for extensive post-capture processing,
    internal photo booth uniform grey finish assists in providing uniform contrast and background.

BRIEF DESCRIPTION OF THE DRAWINGS

These and other features and advantages will be better and more completely understood by referring to the following detailed description of exemplary illustrative non-limiting implementations in conjunction with the drawings, of which.

DETAILED DESCRIPTION

Figure 1:
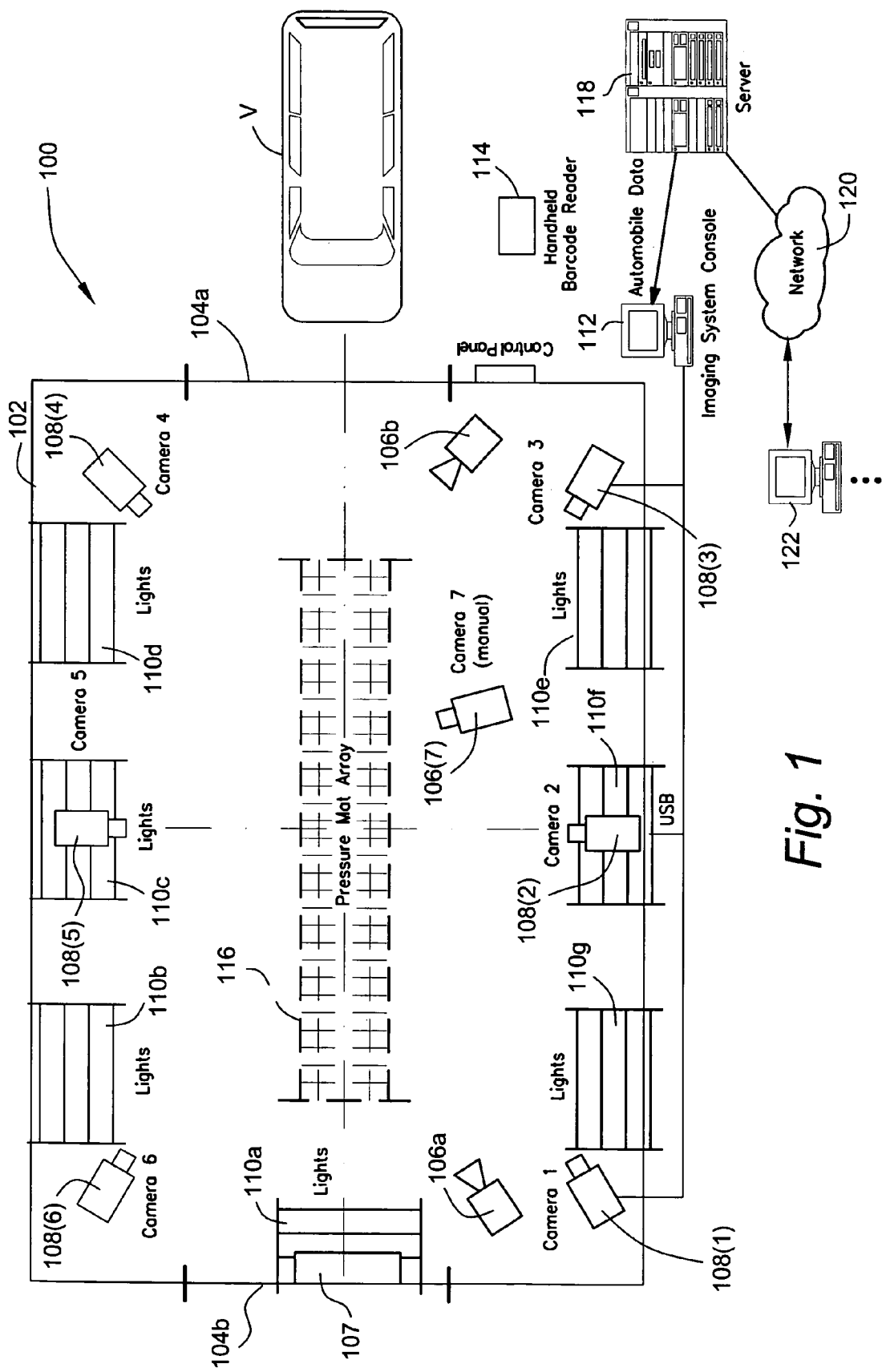
FIG. 1 is a block diagram of an exemplary overall non-limiting implementation of a photo capture system.

FIG. 1 is a schematic diagram of an exemplary illustrative non-limiting vehicle photo booth system 100. System 100 includes an enclosure 102 large enough to house a vehicle V or other object to be photographed and documented, and also houses equipment used to perform this photographing/documenting function. In one illustrative exemplary non-limiting implementation, enclosure 102 may comprise for example a 30'×30' enclosed building. Automatic motor-controlled roll-down doors 104a, 104b are located at opposite ends of the building. Enclosure 102 protects the photographing/documenting equipment, and also provides a controlled background and lighting environment that uses artificial lighting to illuminate the vehicle V being photographed/documented while shielding the vehicle from outside objects and ambient light during the photographing/documenting process. In one exemplary illustrative non-limiting implementation, the interior of enclosure 102 is painted a uniformly drab neutral color such as 18% gray to eliminate undesired interactions with background images and provide predictable illumination results.

In the illustrative exemplary non-limiting implementation of system 100, enclosure 102 houses the following equipment:

- a handheld portable unit 105 in wireless communication with other equipment;
- ultrasonic position sensors 106;
- digital cameras (including zoom control) 108;
- light banks 110;
- imaging system console 112;
- bar code reader 114;
- other equipment.

In one exemplary illustrative non-limiting implementation, the vehicle photo booth 100 consists of various pieces of hardware and software that creates very high quality images of vehicles both consistently and quickly. The equipment includes seven Canon PowerShot Pro1 cameras 108, a barcode scanner 114, and two ultrasonic position sensors 106. In an alternative illustrative non-limiting, the ultrasonic sensors 106 can be augmented and/or replaced by other sensing technology such as for example a pressure mat array 116, laser scanners or other scanning technology.

In the exemplary illustrative non-limiting implementation, imaging system console includes control electronics that automatically controls the cameras 108, lights 110 and doors 104, and which receive inputs from the ultrasonic sensors 106, the cameras 108 and handheld barcode reader 114. Imaging system console 112 in the illustrative non-limiting exemplary implementation communicates with a server 118.

Server 118 (which may be located remotely from the photo booth system 100 and connected via a network such as the Internet) may maintain a database of vehicles V being documented, this database including images captured by photo booth 100. Server 118 may download identification information to imaging system console 112 during the image capture process to make it more efficient for captured images to be matched up to appropriate database records pertaining to a given vehicle. Server 118 may then receive digital images captured by photo booth 100 and store them in association with other vehicle information including vehicle condition reports, etc. Server 118 may make this information available via a network 120 such as the Internet for local or remote access by workstations 122 operated by bidders, prospective purchasers or others. In one exemplary illustrative non-limiting implementation, server 118 may comprise or include a web server that allows remote display appliances 122 to use Internet-based browsers to retrieve and view photographs and other information pertaining to vehicle V. Such remote display may be used preliminarily to sales, for display during a real time Internet-based auction, or in other contexts.

System 100 provides a software application executing on imaging system console 112 to interact with users and control the various equipment shown in FIG. 1. In addition to this imaging system console 112 application, exemplary illustrative non-limiting implementation 100 includes handheld software application executing on handheld unit 105. Handheld unit may comprise for example a portable computing device such as a laptop computer, a PocketPC or other computing device. The imaging system console 112 application controls most of the cameras 108, the lights 110, ultrasound devices 106, and the doors 104. The software application executing on handheld 105 may controls a seventh camera 106(7) (which may be portable and either part of the handheld 105 or remotely connected therewith).

In the exemplary illustrative non-limiting implementation, the imaging system console 112 application and the software running on the handheld 114 communicate with one another, allowing for some control of the imaging system console 112 from the handheld 105. Systems data messages may also be relayed to the handheld 105 from the console 112. In other implementations, the entirety of the functionality may be provided on a console 112, on one or more handhelds 105 or other variations are also possible.

Figure 1A:
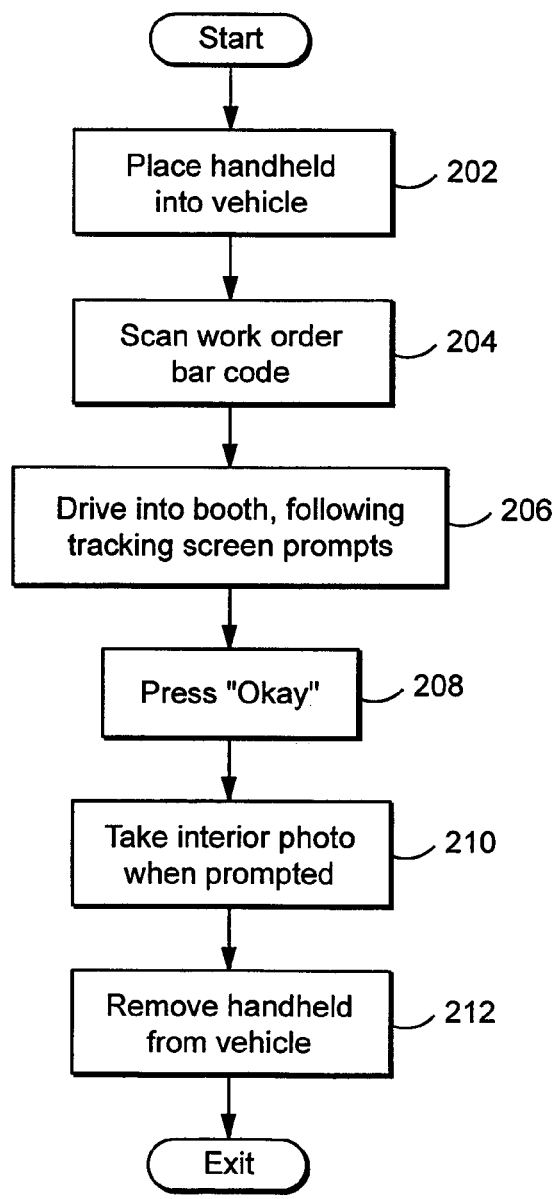
FIG. 1A shows an exemplary illustrative non-limiting sequence of steps for capturing multiple images of a vehicle or other object consistently and quickly.

FIG. 1A shows a flowchart of exemplary illustrative non-limiting steps one may use to operate photo booth system 100 of FIG. 1 to capture multiple high quality images of vehicle V quickly and consistently. In the example shown, a human operator places the portable camera 106(7) and associated handheld controller (which may include a display and an input device, and which may be housed together with the portable camera or simply in communication with it) into the back seat of vehicle V (FIG. 1A, block 202). The human operator then uses a barcode reader 114 that may be part of or separate from the handheld unit 105 to scan a work order barcode or other identifier disposed on vehicle V. In many auction houses and other sales situations, a barcode or other unique identifier is used to uniquely identify different items for sale and to distinguish them from other items. Such bar codes may encode a unique unit tracking number that distinguishes for example a particular Honda Accord for all other Honda Accords being auctioned on that particular day and/or registered with the server 118. Such bar codes may be applied to the vehicle at the time they first enter the auction lot, and may be used to track the vehicle throughout the process. In the case of motor vehicles, the vehicle identification number (VIN) provides a unique identifier applied to the vehicle V at time of manufacture which distinguishes that vehicle form all other vehicles ever manufactured. The barcode scanned by the handheld barcode reader 114 may include the vehicle identification number or some other identifier as the context may provide.

The operator then gets into the vehicle and operates the vehicle to slowly drive it into photo booth 100 and park the vehicle in the center, following tracking screen prompts displayed on a tracking screen display 107. In the exemplary illustrative non-limiting implementation shown, tracking technology using ultrasonic sensors 106, an optional pressure mat array 116 or other tracking technology is used to track the vehicle and provide direction to the vehicle operator as to when and where to stop the vehicle. Other exemplary illustrative implementations might provide a moving belt or track, a chain drive or other mechanism for automatically positioning the item to be documented. In this specific illustrative exemplary non-limiting implementation shown, vehicle V is self propelled and therefore system 100 makes use of the self propulsion feature of the vehicle to allow the vehicle to be positioned under its own power and control. However, in other contexts, the object may be positioned using other means.

Once the human operator has appropriately positioned vehicle V within booth 100, he or she may turn the engine off to avoid carbon monoxide poisoning, or means may be provided to evacuate exhaust gas from the enclosure. The human operator may then jump into the back seat of the vehicle and bend down to hide from cameras 108—thereby avoiding the operator's image being captured with that of the vehicle. In the exemplary illustrative non-limiting implementation, the human operator then operates the handheld device to press the "OK" button—signaling to system 100 that automatic image capture can proceed. In the exemplary illustrative non-limiting implementation, system 100 automatically rolls down both doors 104, extinguishes ambient overhead fluorescent lighting if on, activates halogen or other high-intensity lights 110 for photo illumination, and proceeds to substantially simultaneously capture images from each of the various cameras 108 to document the vehicle V from various different angles. Ultrasonic sensors 106 provide vehicle dimensional and configuration information that imaging system console 112 automatically analyzes and uses to control mechanical or other zooming functions on some or all of cameras 108 to provide appropriate cropping/field of view at time of image capture. Alternative implementations might use software-based image cropping functionality instead of or in combination with mechanical zooming capabilities.

Once system 100 has automatically captured the various images of vehicle V, the system displays the captured images so the operator can view them. The display may be on both imaging system console 112 and handheld unit 105 for the operator's convenience. The system 100 also signals to the handheld unit 105 to request the human operator to take an interior picture of the front portion of the passenger compartment from the back seat (FIG. 1A, block 210). This captured image is automatically relayed from the handheld unit 105 to imaging system console 112 via a wireless or other link. The human operator may also, in his or her discretion, capture additional photos of the vehicle to document additional details (e.g., damage or special features). At this point system 100 automatically opens both doors 104 and instructs the human operator to restart the engine of vehicle V and drive it out of the photo booth 100. The entire image capture process can be completed in less than thirty seconds per vehicle. The actual image capture may for example take less than 30 seconds, although the process from bar code scan to bar code scan or car to car averages 1 minute and 6 seconds to provide multiple, high quality, consistent images.

Figure 2:
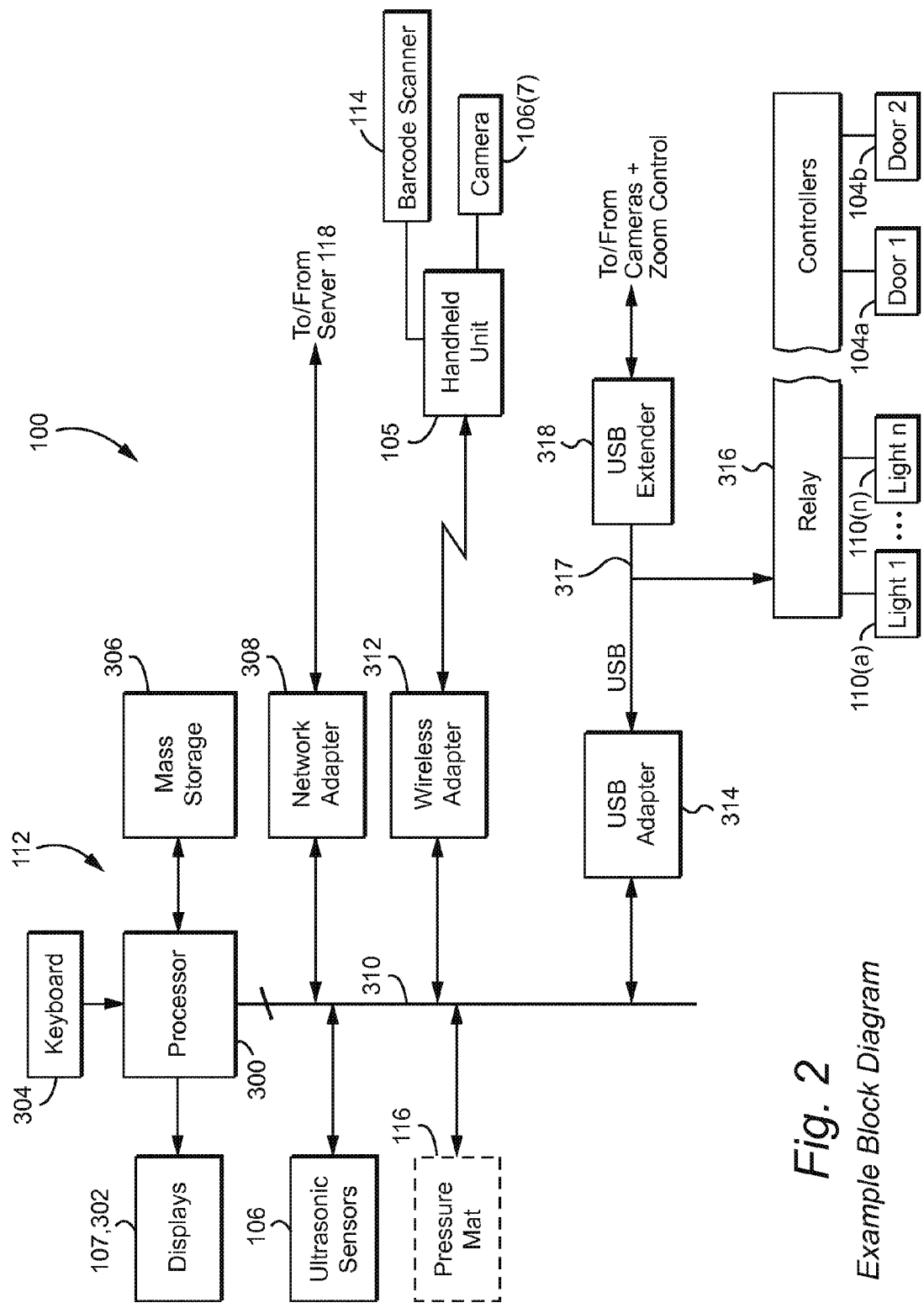
FIG. 2 shows a more detailed exemplary illustrative non-limiting block diagram.

FIG. 2 shows an exemplary illustrative non-limiting block diagram of the FIG. 1 system 100. In the exemplary configuration shown, imaging system console 112 may include a processor 300, displays 107, 302, input devices including a keyboard 304, and mass storage 306. A network adapter or other link 308 allows the processor 300 to communicate with server 118. Ultrasonic sensors 106 may communicate with processor 300 over a conventional bus 310. If a pressure mat 116 is used, it may similarly provide inputs to processor 300. A wireless adapter 312 may allow wireless communications with handheld unit 105 which may include its own processor, storage, display, input devices and other features. Handheld unit 105 may include or communicate with a handheld barcode reader 114, it may also include or communicate with camera 106(7).

Processor 300 uses a USB adapter 314 to communicate with a relay controller 316. Relay controller 316 allows the processor 300 to control the power to the various lights 110 and the up/down control of doors 104a, 104b. A USB extender 318 may be provided to allow the processor 300 to communicate with the various cameras 106 and associated mechanical zoom controls. In the exemplary illustrative non-limiting implementation shown, relay controllers 316 may comprise a pair of "hybrid" controller cards providing both relays and low-voltage input/output. In the exemplary illustrative non-limiting implementation, the relays are used to control the doors 104 and the lights 110. Each automatic camera 108 is controlled via the USB connection 317 to the imaging system console 112. Since the cameras 108 are typically mounted much further away than the typical 16 foot limit on USB devices, USB extenders 318 and conventional cables are used to extend the USB range. Other links including WIFI (IEEE 802.11), Firewire (IEEE 1394) or other conventional control and data links could be used instead of or in addition to the USB links to provide connectivity between the image system console 112 and automatic cameras 108.

Figure 3A:
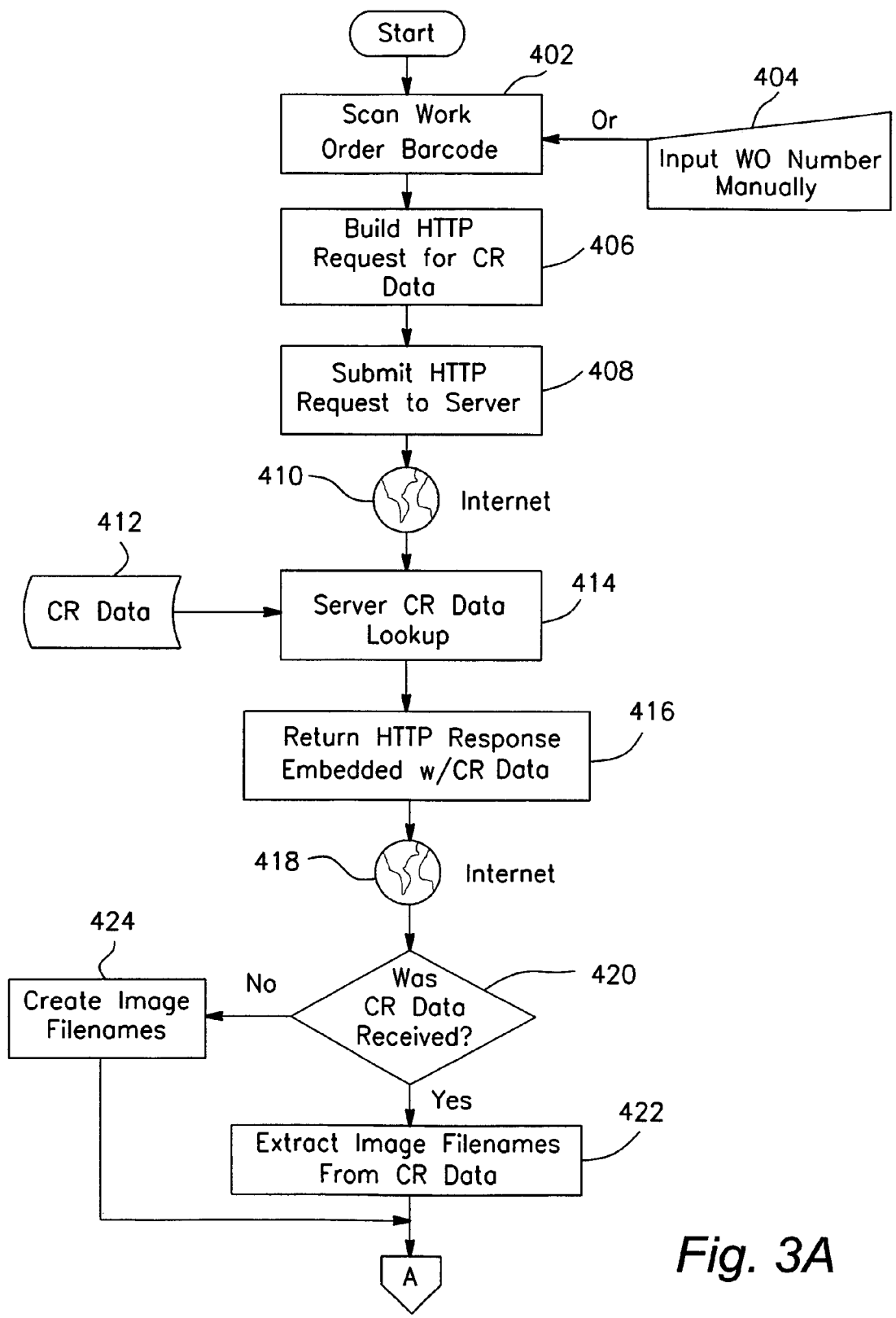
FIGS. 3A-3C show exemplary illustrative non-limiting software control flowcharts.
Figure 3B:
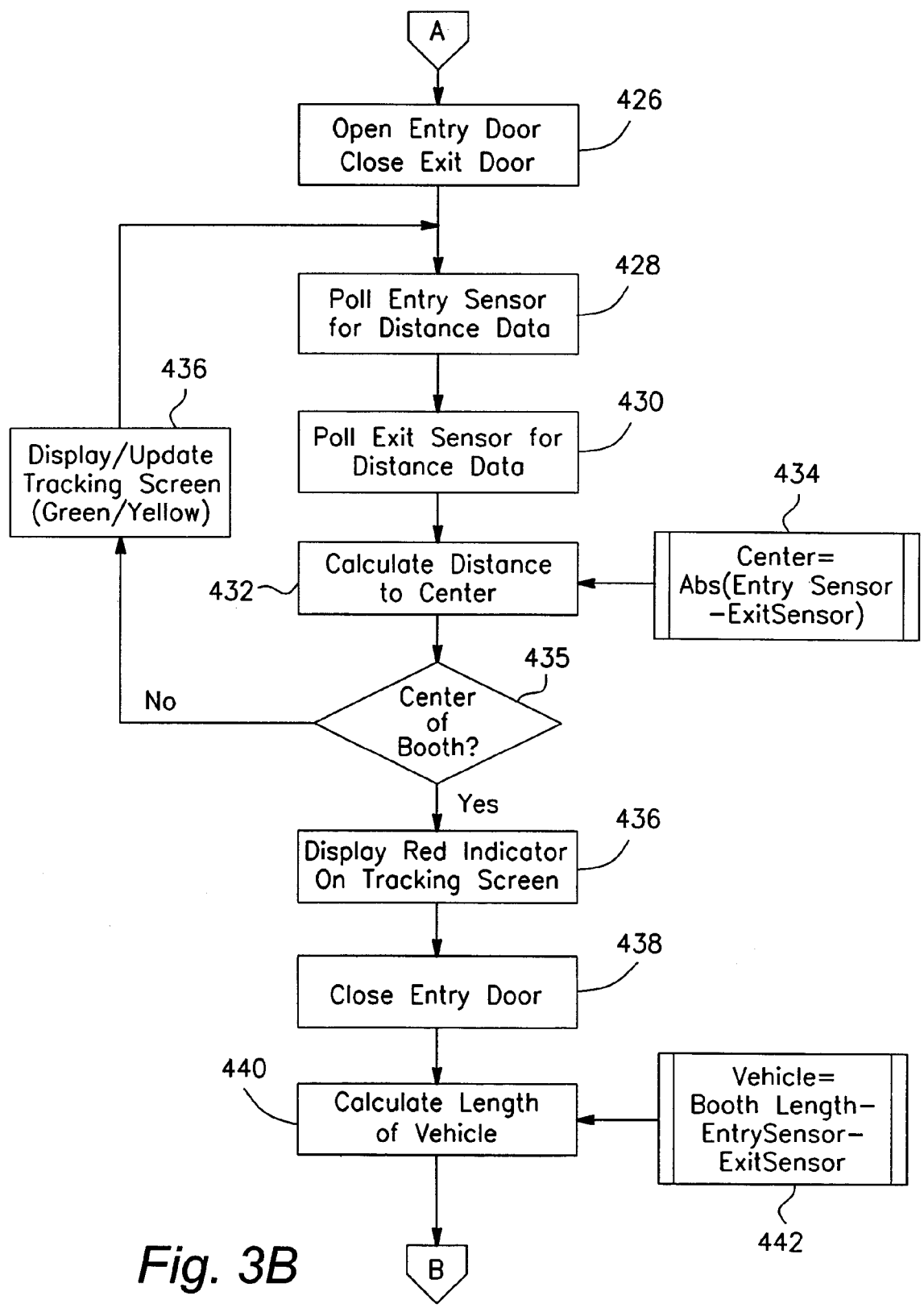

FIG. 3A-3B show exemplary software-controlled steps performed by imaging system console 112 in conjunction with handheld unit 105 to capture images of a vehicle V. In the example shown, the operator as described above uses the barcode reader 114 to scan the work order barcode (FIG. 3A, block 402) or uses another input device to manually input the work order number or other identifier (FIG. 3A, block 404). In the example shown, imaging system console 112 builds an http request for data associated with the vehicle being documented (FIG. 3A, block 406) and submits the http request to server 118 via a socket connection (block 408). The request submission may be via a network 120 such as the Internet if desired (FIG. 3A, block 410). The server 118 (which may be remotely located from the photo booth 100 and used to service many different photo booths at locations around the country or around the world) performs a database lookup (blocks 412, 414), and returns an http response embedded with data pertaining to the vehicle (block 416). Once again, this response may be transmitted back to imaging system console 112 via the Internet or other network 120 (block 418). If the database information was received ("yes" exit to decision block 420), the imaging system console 120 extracts image file names from the received data (block 422). Alternatively, if the data is not received ("no" exit to decision block 420), imaging system console 120 may create its own image file names (block 424).

Figure 4A:
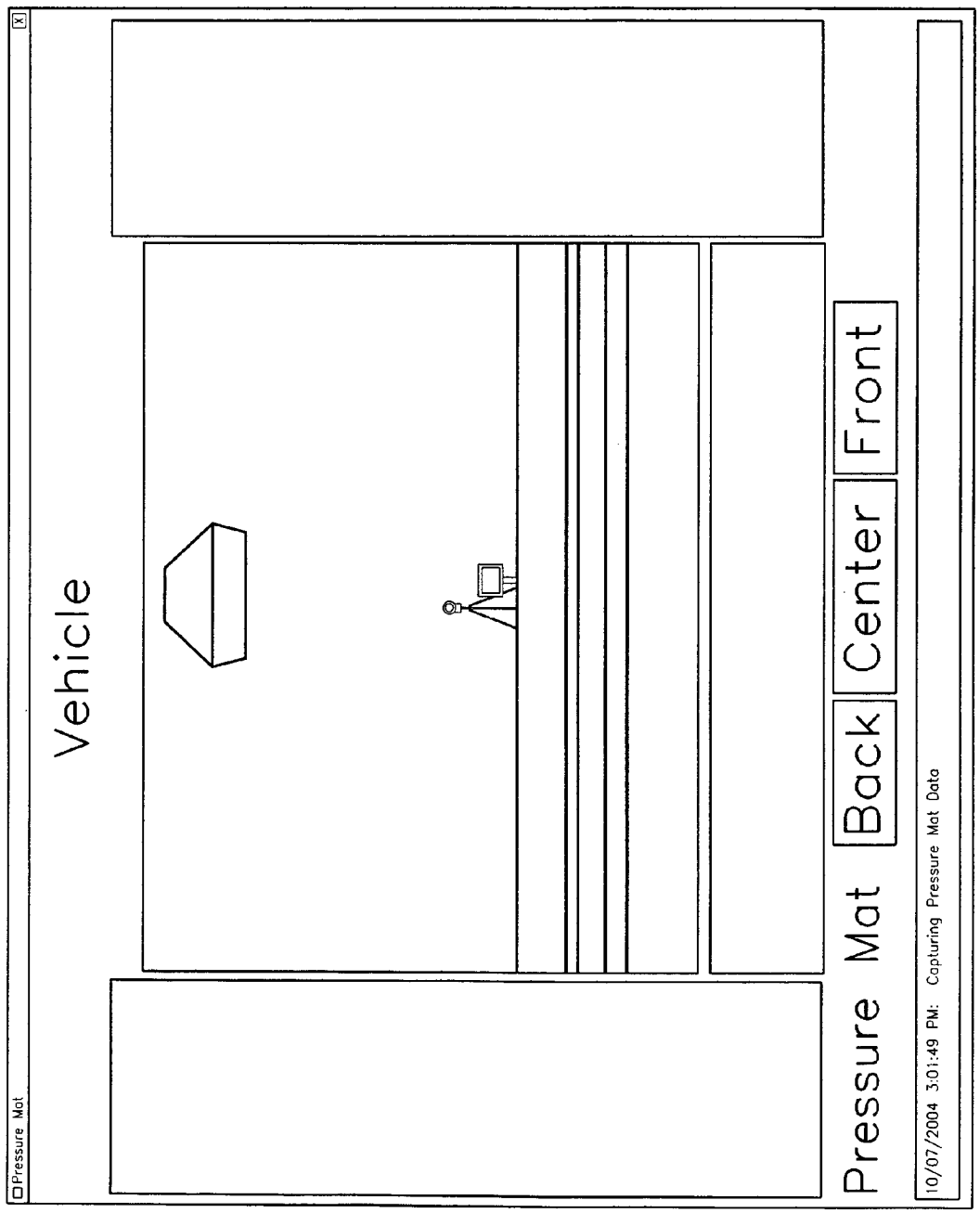
FIGS. 4A and 4B show exemplary illustrative non-limiting vehicle tracking displays.
Figure 4B:
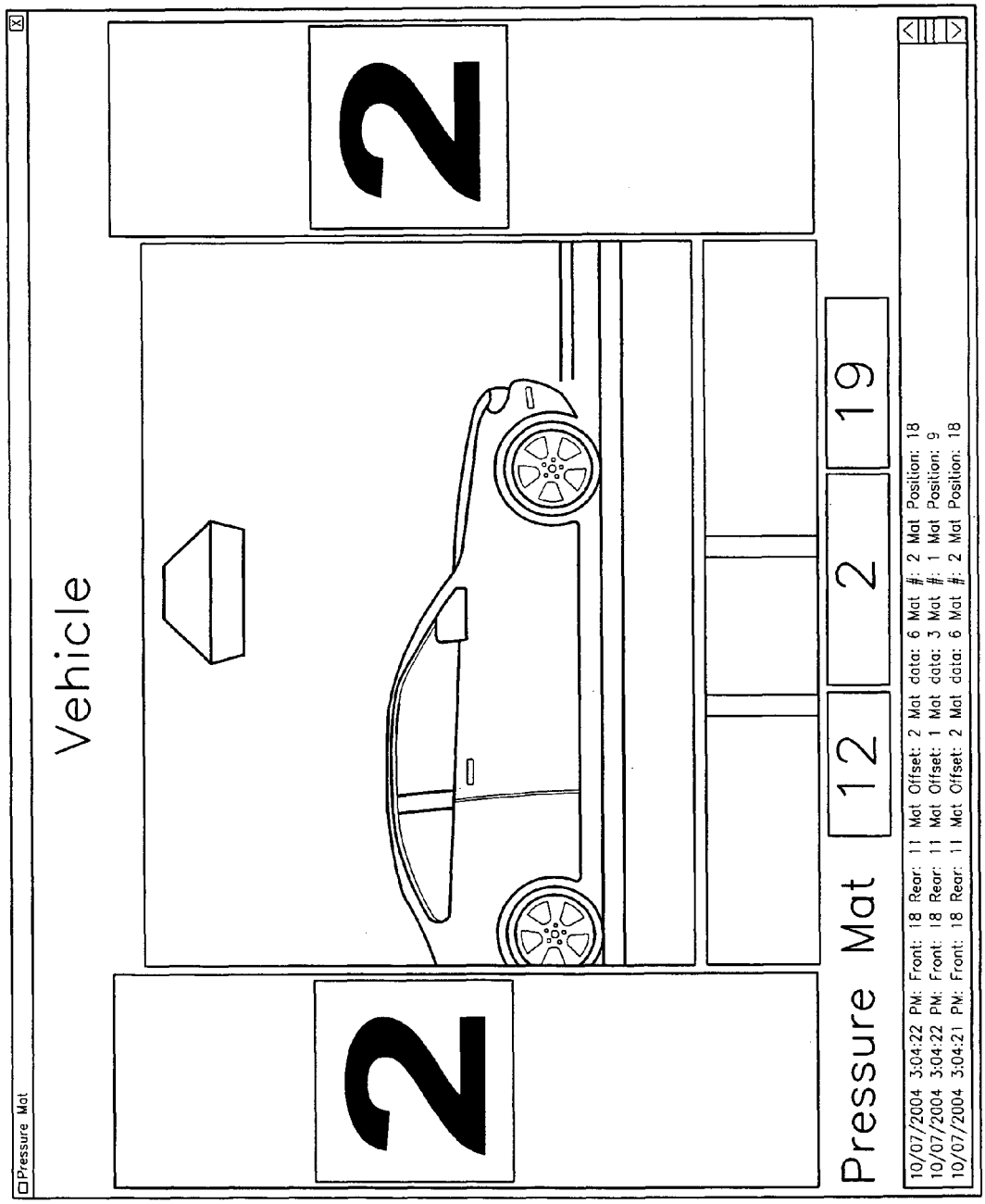

In the example shown, imaging system console 112 then automatically controls exit door 104b to close and entry door 104a to open (FIG. 3B, block 426). Imaging system console 112 then polls the ultrasonic sensors 106a, 106b for distance data (FIG. 3B, block 428, 430), and continually calculates the distance of vehicle V from the center of the photo booth (FIG. 3B, block 432). For example, imaging system console 112 may calculate the center as being the absolute value of the entry sensor 106b distance minus the exit sensor 106a distance (FIG. 3B, block 434). Imaging system console 112 determines whether vehicle V has yet moved to the center of the booth (decision block 435). If it has not, imaging system console 112 may display/update a tracking screen using different coloration (green/yellow) to instruct the vehicle operator to continue to come forward into the photo booth (FIG. 3B, block 436). FIGS. 4A and 4B show exemplary vehicle tracking displays. As shown in FIG. 4A, the vehicle tracking display is used for tracking the location of the vehicle in the photo booth. The display may be located for example on the far end of the enclosure where the vehicle driver can easily see it. The exemplary display shown consists of a view of the viewfinder information for one of the cameras (e.g., camera 108(5)), a numerical countdown of where to stop the vehicle, and colored bar indicators of when to stop the vehicle. Observing the location of the vehicle in the viewfinder is a timely method of placing the vehicle in the center of the booth. The two ultrasonic detectors 106a, 106b track the exact location of the vehicle V as it rolls through the imaging area. These two detectors determine when the vehicle has reached the center of the imaging area and signals the driver to stop when the center has been reached. In the exemplary illustrative non-limiting implementation, the location is also displayed numerically.

There are three numbers displayed on the tracking screen in the exemplary illustrative non-limiting implementation. The first number indicates where the vehicle is located. The second (center) displays how far to go before the center is reached. The third indicates where the front of the vehicle is located. See FIG. 4B. Displayed green bars change to yellow as the vehicle approaches the center of the booth. When the vehicle is within four feet of the center point, the bar turns red. The display remains on screen for a few seconds to allow further adjustments. After a few seconds, the viewfinder screen is displayed and the position of the vehicle can be seen from all camera angles.

Figure 3C:
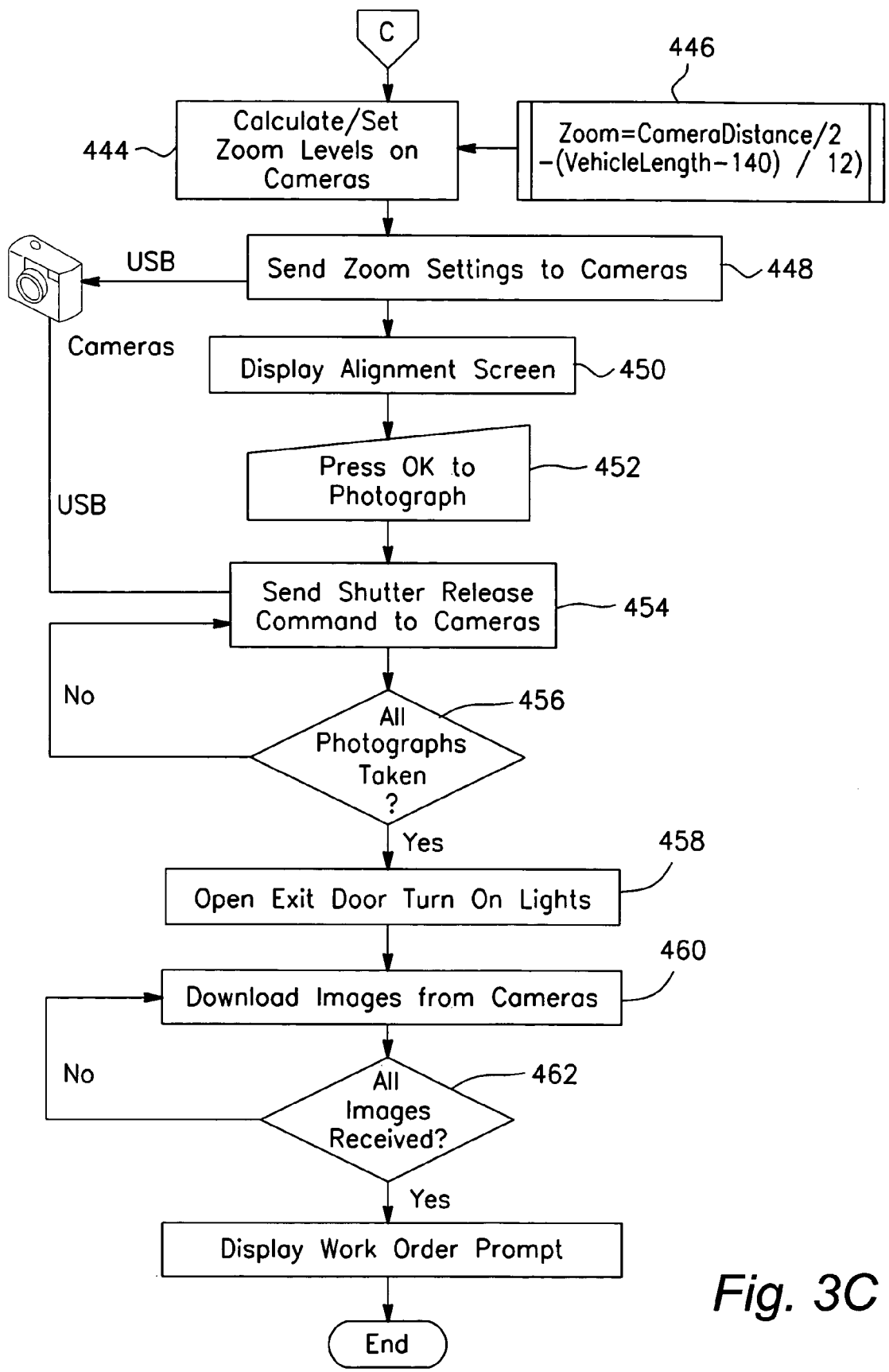
Figure 5:
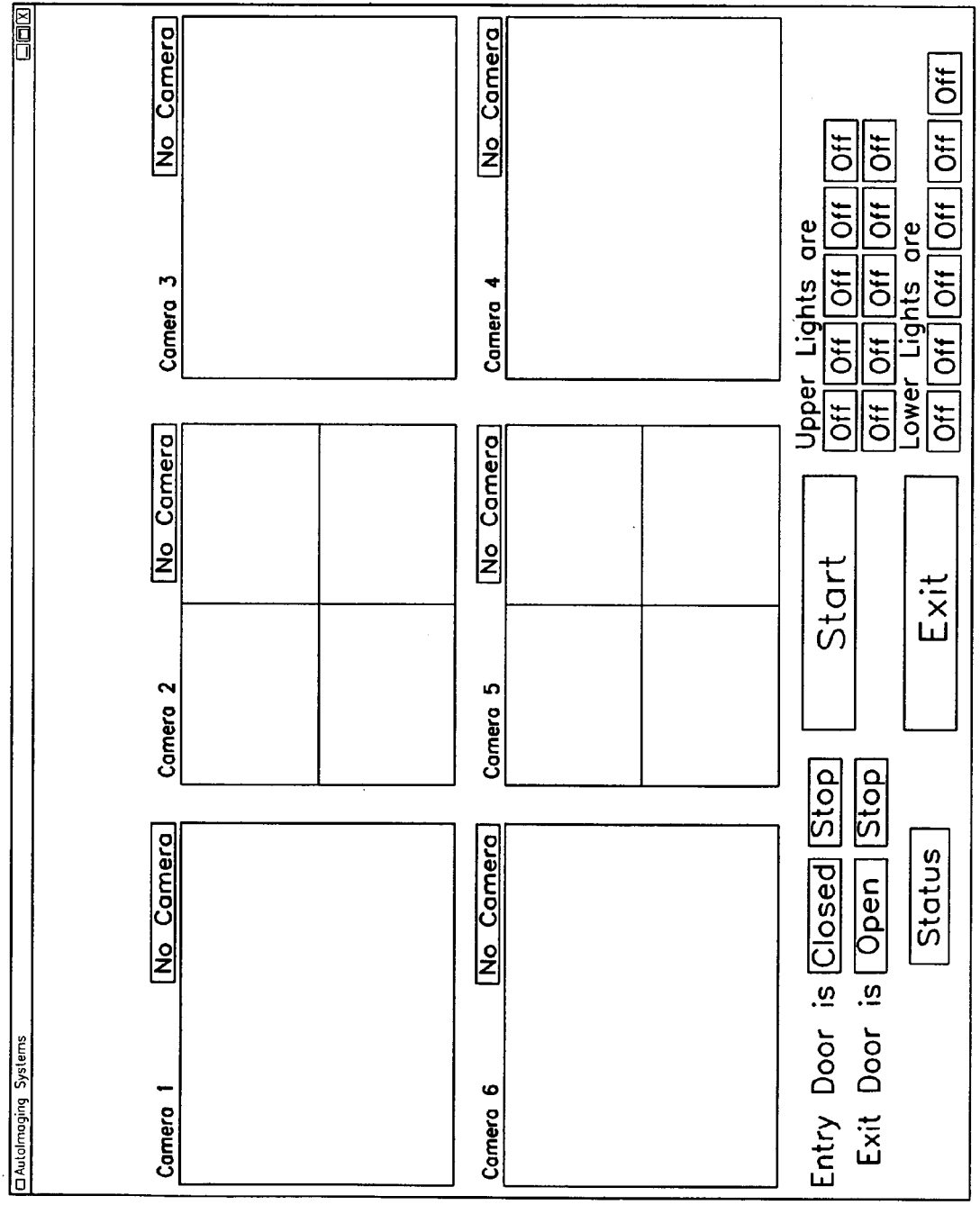
FIG. 5 shows an exemplary illustrative non-limiting console viewfinder screen display.
Figure 6:
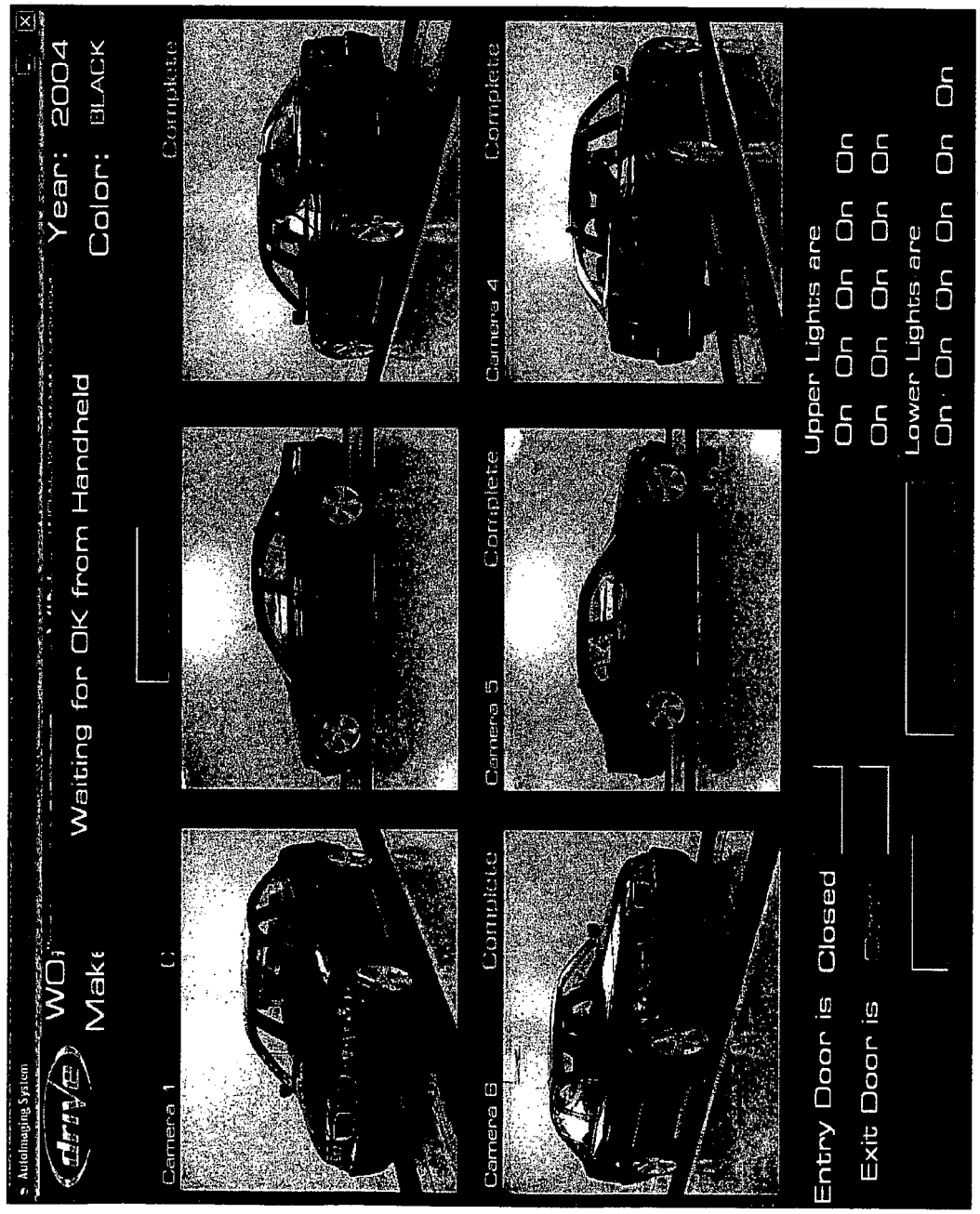
FIG. 6 shows an example image capture display screen.

Referring once again to FIG. 3B, once the red indicator is displayed on the tracking screen indicating that the vehicle is now located in the center of the booth (FIG. 3B, block 436), imaging system console 112 automatically closes the entry door 104a and then calculates the length of the vehicle V based on the current ultrasonic sensors 106a, 106b inputs (FIG. 3B, block 440). For example, imaging system console 112 may calculate the vehicle based on booth length minus entry sensor distance minus exit sensor distance (FIG. 3B, block 442). The imaging system console 112 calculates and sets zoom levels on the various cameras 108 based on the vehicle length and individual camera distances (FIG. 3C, block 444, 446). For example, the zoom may be calculated as the camera distance/2−(vehicle length−140)/12 or other appropriate calculation. Imaging system console 112 then sends the zoom settings to the various cameras 108 to control mechanical or electronic zoom (FIG. 3C, block 448). Meanwhile, imaging system console 112 may display a console viewfinder screen as shown in FIG. 5. This console viewfinder screen may show images being captured by each of the cameras 108 as well as status information concerning the entry and exit doors, the lights and other information. FIG. 6 shows an example console viewfinder screen during image capture showing the different exemplary views of an example vehicle from six different automatic cameras 108 simultaneously. See FIG. 3C block 450.

Figure 7:
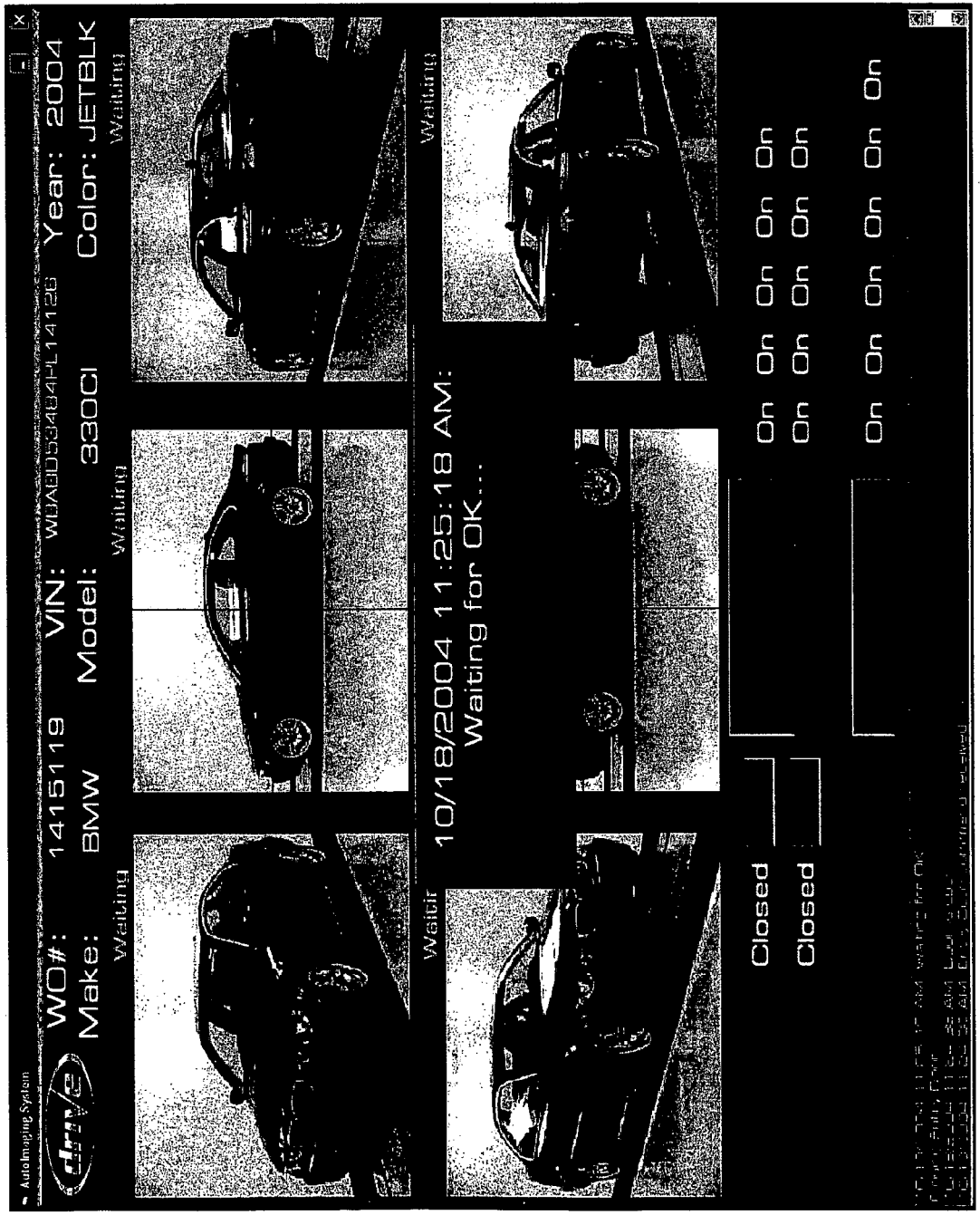
FIG. 7 shows an example illustrative non-limiting image capture approval screen.
Figure 8A:
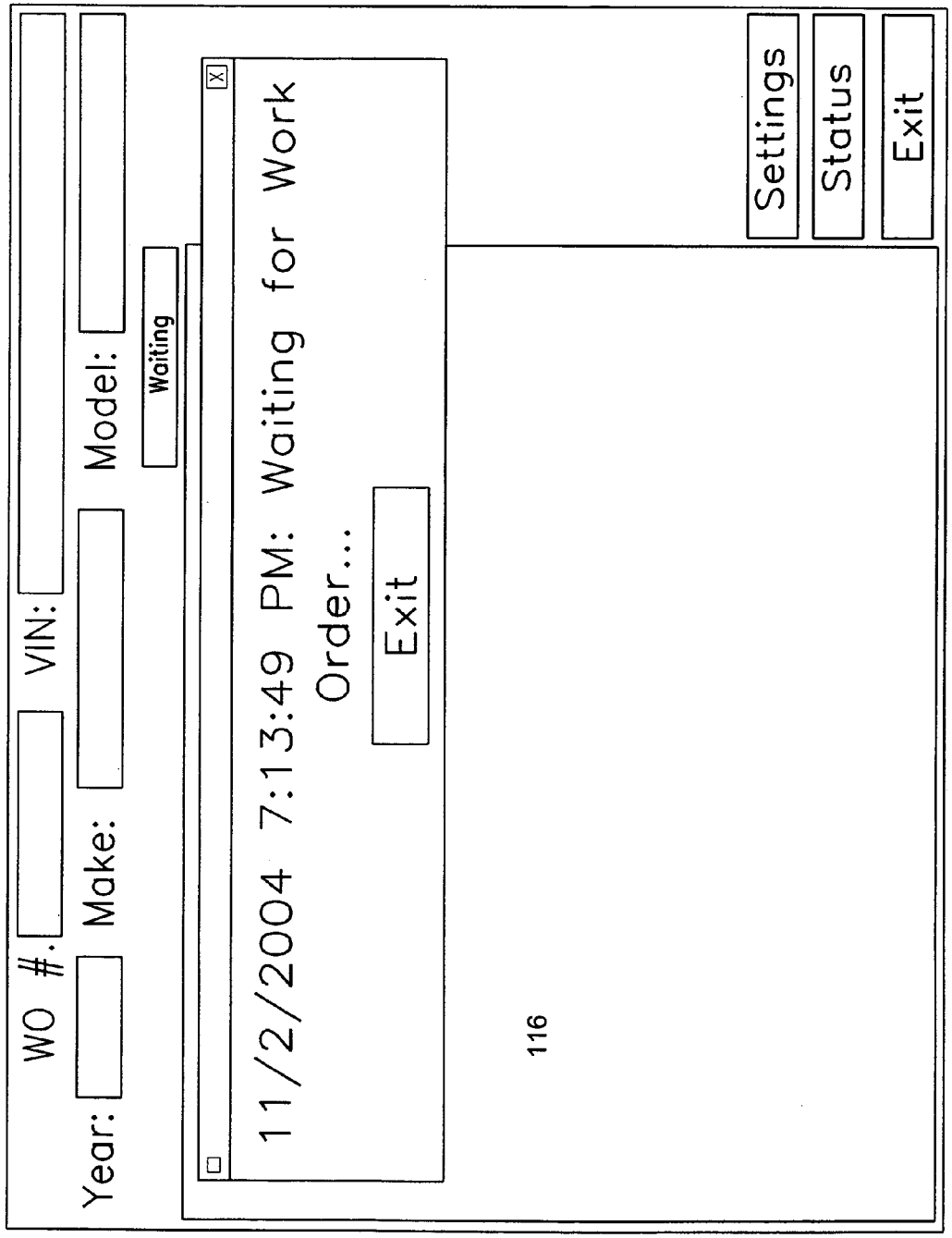
FIGS. 8A and 8B show exemplary illustrative non-limiting work order input screens.
Figure 8B:
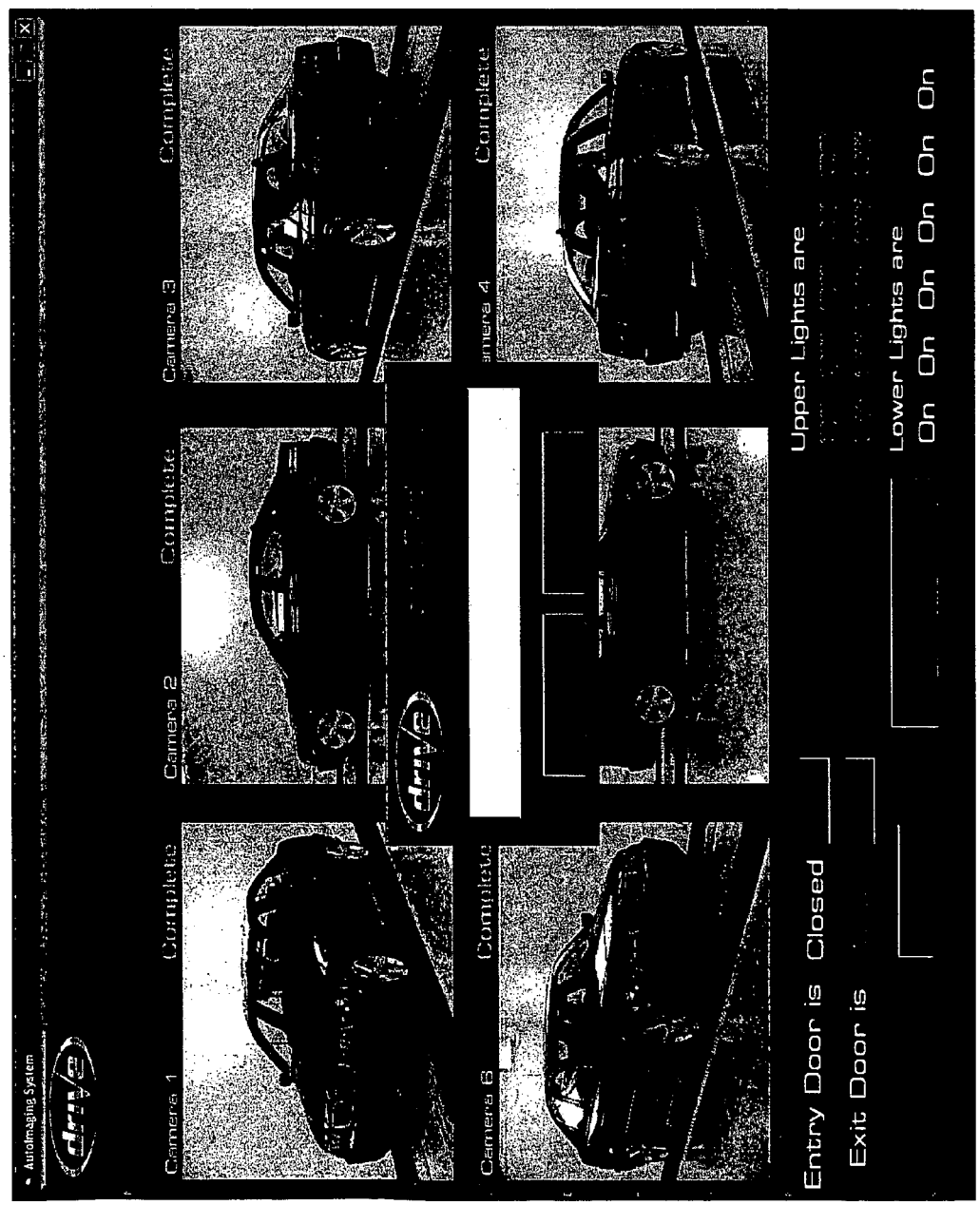

At this point, the exemplary illustrative non-limiting system 100 expects a human operator to view the image capture approval screen and signal "OK". While this manual image approval step could be dispensed with, in at least some applications there is no substitute for a person looking at the proposed image capture results and deciding whether adjustments are needed or whether the proposed results would be acceptable. The example image capture approval screen shown in FIG. 7 may be displayed on the handheld 105 and/or on the display of the image system console 112. Once the human operator indicates "OK to photograph" (FIG. 3C, block 452), image system console 112 sends shutter release commands to the various cameras 108 which causes each of the cameras to capture an image and send the resulting image files to the imaging system console 112 (FIG. 3C, block 454). Once all photographs (decision block 456), system 100 may then instruct the operator to use the portable camera 106(7) to capture an interior photograph of the vehicle. Imaging system console then opens exit door 104b (block 458), downloads all the images from the cameras 108 (blocks 460,462), and displays a work order prompt of the exemplary configuration shown in FIGS. 8A and 8B. In more detail, the work order prompt display shown in FIG. 8A may be displayed on the handheld 105, while the work order prompt display shown in FIG. 8B may be displayed on a stationary display of imaging system console 112.

If something goes wrong and a picture has to be retaken, there are at least two ways to re-image a vehicle. One is to completely start over and run the vehicle through the photo booth system 100 again. Another technique is to click on a viewfinder screen and press photo to re-image from that particular angle. Once the automatic imaging is complete, the imaging system console 112 signals to the portable handheld 105. The operator may then use the portable handheld 105 to take one or more pictures. At least one photograph is usually is usually desirable. In some instances, when the operator feels it is necessary to document particular condition information such as dents or other defects having a bearing on the condition of the vehicle, the operator may use the portable handheld 105 to take additional photographs. After each picture is taken, it is downloaded to the console and then redisplayed on the handheld 105. Once all of the images are downloaded from the cameras 108, the screen is displayed waiting for additional images from the portable. Automated naming of images can also be provided to provide a uniform image naming convention that can be processed automatically by a server to provide correct image orientation placement on a web-based or other presentation display.

The FIG. 5 example console viewfinder screen provides a display of the camera viewfinders and the status of the lights and doors. Status of the ultrasound detectors is displayed in a separate screen that is used to track the position of the vehicle entering the photo booth. This separate screen also allows the viewfinder information from one of the side cameras to allow for easier and more accurate vehicle centering in the booth. The main screen is separated into three points in the exemplary illustrative non-limiting implementation. The first part contains the vehicle information. The second part contains the viewfinder information. The third part contains the door and light status information and the system status information. There are also special command buttons in the center of the screen that are used for controlling the operation of the system 100. Entering a work order number is the first step of the imaging process. The work order number is used to retrieve vehicle information from the server 118. Once the vehicle information is retrieved, it is displayed across the top of the main screen. The information displayed includes the work order number, the vehicle identification number (VIN), and the year, make, model and color of the vehicle. The viewfinder information area displays the viewfinder data from each camera attached to the system. The exemplary illustrative non-limiting implementation cameras are labeled 1 through 6 or 1 through 7 or using other appropriate designators. As the program starts, each camera is initialized. Once initialized, the viewfinder data is sent to the console so that the operator can see what the camera sees. There is a camera status display above each viewfinder display. This display is initialized to "waiting" but changes to "imaging" when the cameras are being used to take pictures. The display changes to "downloading" while the image data is being downloaded to the console PC. After the file is downloaded, the display changes to "complete". The viewfinder is initialized at startup. If conditions change, such as opening or closing the doors or turning the lights on or off, the output of the viewfinder may become darker or lighter. This condition can be corrected by clicking on the image to display the camera settings screen, or by taking pictures with the camera.

The bottom of the exemplary illustrative non-limiting FIG. 5 display contains the status displays for the entry and exit doors and for upper and lower lights. The entry and exit doors can be either open or closed, and the lights can either be on or off. These status displays are also used to manually control the doors and lights. Simply tap the indicator for each light or door to change its status. For example, if open is displayed, tapping it will change it to closed. Tap stop to stop either door. The same applies to the lights. If the light display is on, tapping it will change it to off. Note that the door status can sometimes be incorrect. The door control is a "momentary" switch in the exemplary illustrative non-limiting implementation that cannot be "read" by the exemplary illustrative controller. To manually open or close the door, this change in status is not displayed on the console.

A system status log may be displayed by pressing the status button at the bottom of the screen. The most recent entry is at the top of the display.

There are two command buttons that are placed in the center of the screen. The first one is the start button and starts the imaging process by displaying the prompt for a work order. The second button is the exit button and it unloads the program. There is a third button that displays once the vehicle has been centered in the booth. This button is "vehicle OK to photograph." Once the vehicle is centered, the camera zoom settings are correct, and the cameras are pointed to the correct locations, press this button to start the automatic imaging process. The equivalent of this button may be indicated by pressing on the handheld 105 display.

Figure 9:
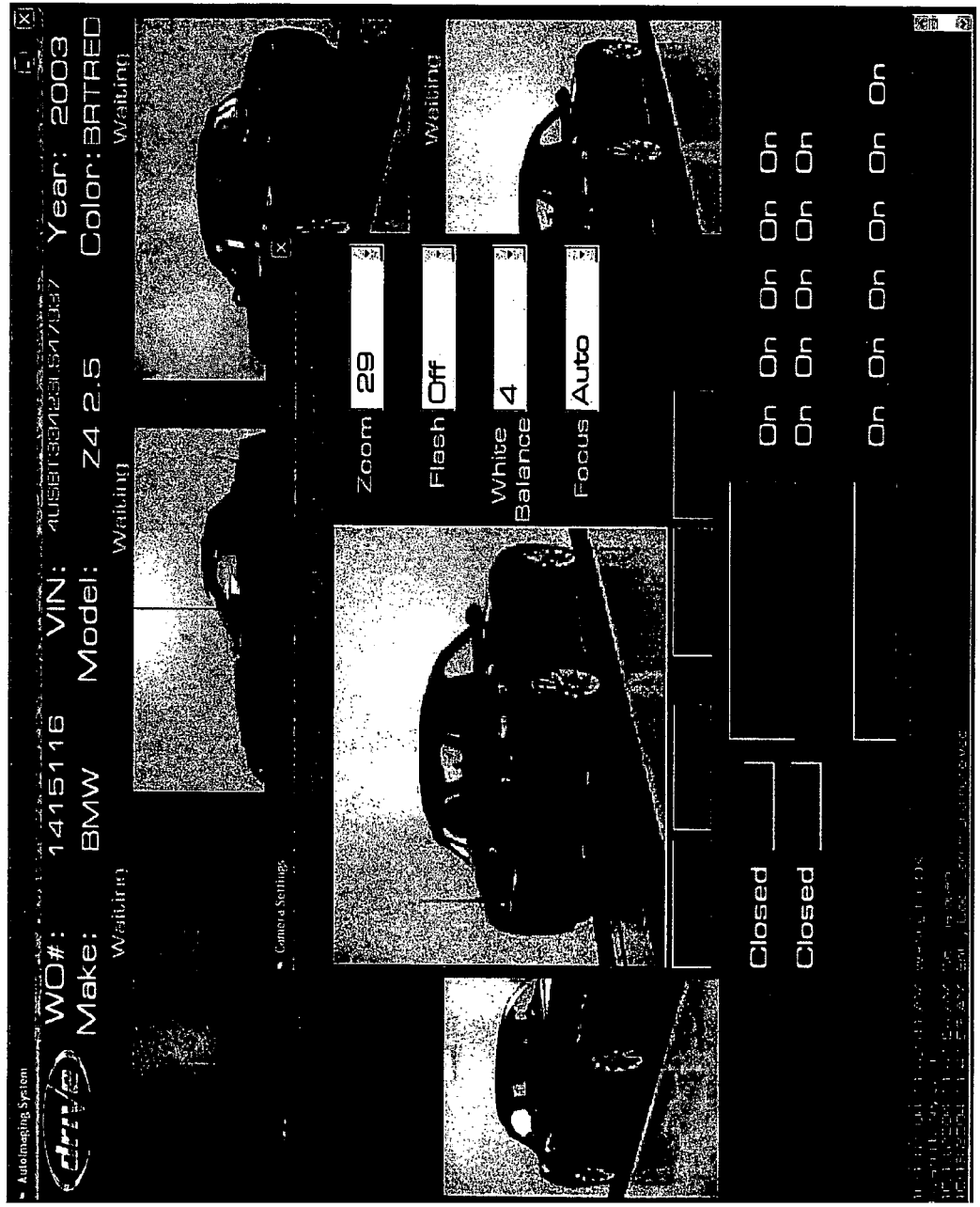
FIG. 9 shows an example illustrative non-limiting camera settings screen.
Figure 9A:
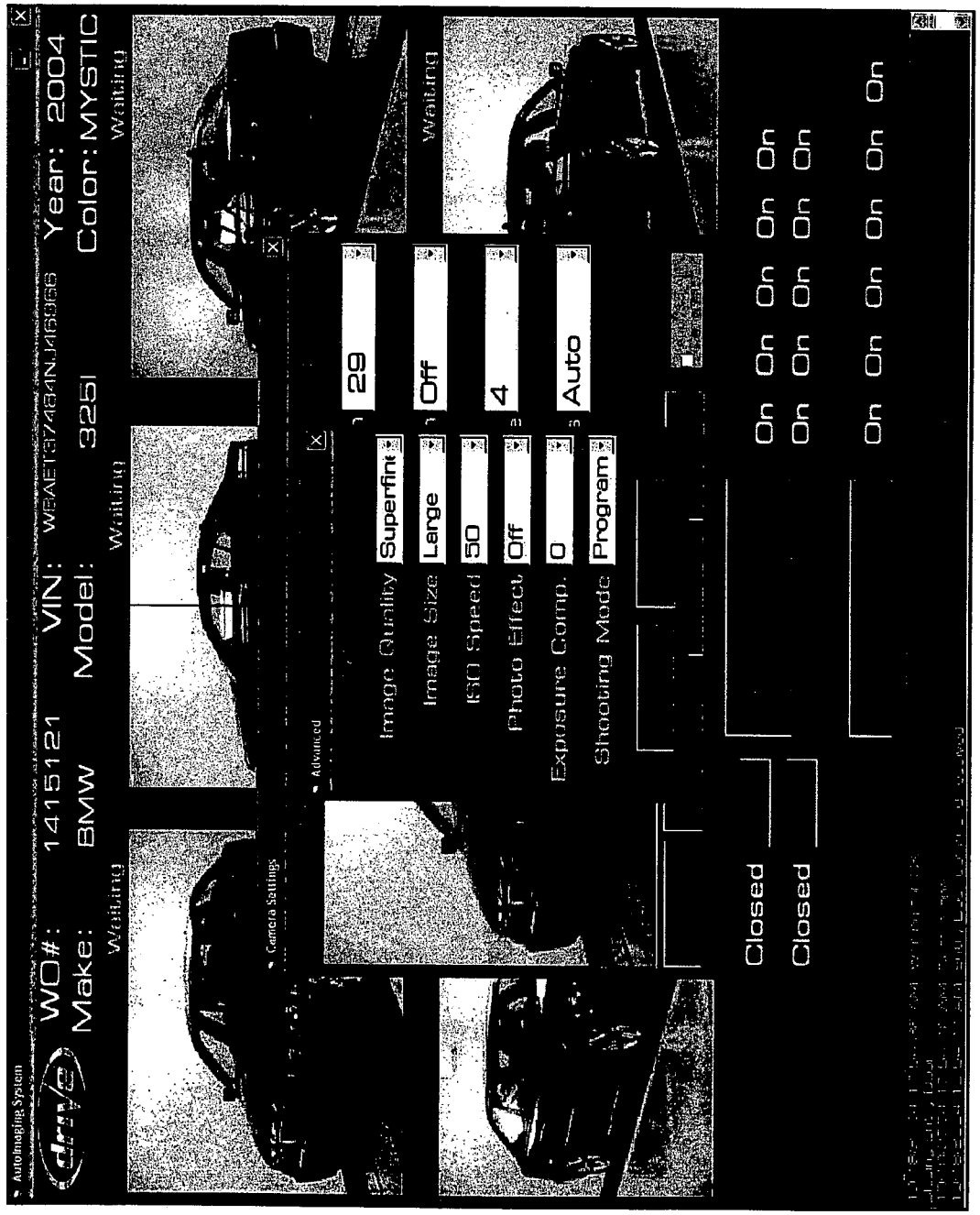
FIG. 9A shows an exemplary illustrative non-limiting advance camera settings screen.

Each camera can be configured by tapping on that camera's viewfinder screen. FIGS. 9 and 9A show exemplary illustrative camera setting screens. The camera settings include zoom, flash, white balance and focus. Typically, the setting that is changed most often is zoom. The FIG. 9A advanced setting screens allow access to more camera settings. It is possible to press the "photo" button to take a picture.

In the exemplary illustrative non-limiting implementation, all settings are adjusted via a type of selection box called a drop down. The values in the drop down are displayed by tapping the arrow on the right side of each drop down box. To change the setting, select a different value from the one displayed in the box. Available settings in the exemplary illustrative non-limiting implementation shown in FIG. 9 include zoom, flash, white balance and focus. The zoom values are dependent on the type of camera. Typical flash values are off, on and red eye. The photo booth cameras are normally set to off. White balance is a setting that used to calibrate the camera to where it is located. The focus setting determines the way the camera will focus on an object. Typical values are auto and close-up. The close-up setting may be necessary depending upon the zoom setting. The FIG. 9A advance camera setting screen allows additional settings including image quality, image size, ISO speed, photo effect, exposure computation and shooting mode. The image quality allows the operator to determine how much compression (or none at all) will be used on a raw image for capture. Typical values for image quality are fine, super fine and lossless. Exemplary cameras 108 may for example provide a lossless setting of 8 mega pixels or a 3264×2448 pixel image. Image size determines the dimensions of the captured image. Typical settings are large, medium and small. A large image may be 3264×2448 pixels, a medium image may be 1024×768, 1600×1200 or 2272× 1704 pixel image. The small image may be 640×480 pixels. ISO speed determines the light sensitivity of the cameras 108. The higher the ISO, the noisier the image will be. The photo effect is a filter that can be used to brighten, soften or color an image. Custom filters can be created and selected if necessary. Exposure compensation settings simulates the ability of some cameras to modify the exposure by one more stop settings. Higher exposure compensation settings lengthen the exposure time and increase the saturation of the image. Decreasing the exposure compensation setting does the opposite. In the exemplary illustrative non-limiting implementation, the "shooting mode" can be set to auto, or manual, Av (aperture priority), or Tv (shutter priority).

Figure 10:
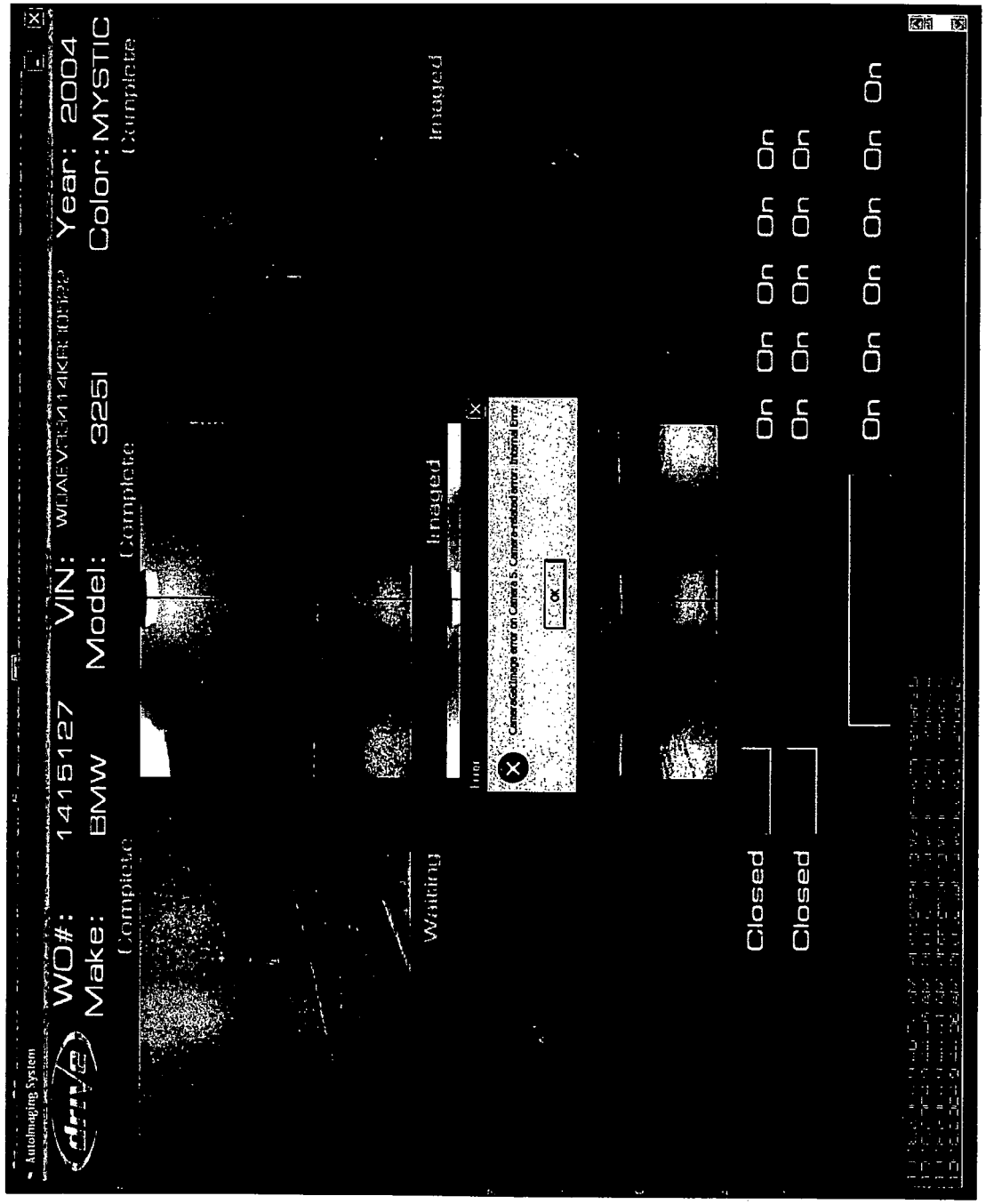
FIG. 10 shows an example camera error message.

The system 100 is designed to control multiple cameras by identifying each separate camera, configuring it to work properly, and then "talking" to each camera separately. This way, each camera is independent of the others and different types of cameras can be installed. Each camera function has its own error display. For example, if an error occurs while the camera is taking a picture of the vehicle, a message such as that shown in FIG. 10 may be displayed. The name of the offending function may be displayed along with a short message that provides a hint of the cause of the error. Most image errors can be routinely handled by cycling power to the cameras, canceling any software prompts, restarting the software and reentering the vehicle identification number.

An exemplary illustrative non-limiting configuration file description is set forth below:

CONFIGURATION FILE DESCRIPTION

File Save Location - This is where the image files are saved. It is also where the text files used by the handheld 105 and the console 112 are read and written.
COM Port - The communications port used by the relays.
Momentary Relay Timing - The entrance and exit doors are triggered by a simulated momentary relay. The timing for the length of the "moment" is set here.
Background Image - The program can have any background image for its main screen.
Minimum Images - The minimum number of images to take. This overrides the server 118 in case of data errors. This value is overridden by the number of cameras - there should not be more images than cameras in one exemplary implementation.
Lights - Set to 1 if the light is on at startup, 0 if the light is off at startup.
Cameras - Describes various camera settings.
The configuration file listing is as follows:
'---------------------------------------------------------------------------
' DRIVEConfig.txt configuration file
'
' Supported Entries:
'       ' Comment Line
'       Savedir:<pathname>\
'       Camera#: <camera setting>
'       Light#: <light setting (on/off)>
'---------------------------------------------------------------------------

| CONFIGURATION FILE DESCRIPTION |
|---|
| `
' File Save Location
SaveDir:C:\ARCHIVE\DRIV\
`
'Com Port
CommPort:1
`
' Momentary Relay Timing
Relay:50
`
' Background Image
Background:Background4Lg.jpg
`
' Minimum Images
MinImages:7
`
' Lights
UpperLightBank0:0
UpperLightBank1:0
UpperLightBank2:0
UpperLightBank3:0
UpperLightBank4:0
UpperLightBank5:0
UpperLightBank6:0
UpperLightBank7:0
UpperLightBank8:0
UpperLightBank9:0
LowerLightBank0:0
LowerLightBank1:0
LowerLightBank2:0
LowerLightBank3:0
LowerLightBank4:0
LowerLightBank5:0
`
' Cameras
Camera0Name:PowerShot G5
Camera0ExpComp:24
Camera0Flash:1
Camera0Focus:1
Camera0ISO:72
Camera0Effect:0
Camera0ShootingMode:1
Camera0Zoom:5
Camera0Quality:5
Camera0Size:0
Camera0WB:4
Camera1Name:PowerShot G5
Camera1ExpComp:24
Camera1Flash:0
Camera1Focus:1
Camera1ISO:72
Camera1Effect:0
Camera1ShootingMode:1
Camera1Zoom:0
Camera1Quality:5
Camera1Size:0
Camera1WB:4
.
.
.
Camera6Name:Canon PowerShot Pro1
Camera6ExpComp:24
Camera6Flash:2
Camera6Focus:1
Camera6ISO:72
Camera6Effect:0
Camera6ShootingMode:1
Camera6Zoom:0
Camera6Quality:5
Camera6Size:0
Camera6WB:4 |

While the technology herein has been described in connection with exemplary illustrative non-limiting implementations, the invention is not to be limited by the disclosure. For example, while the exemplary objects to be photographed as described above are motor vehicles, any objects could be imaged and documented. The number of cameras or other image capture devices are exemplary—any number could be used. Instead of digital cameras, other devices could be used to capture information about the objects. While mechanical zooming is used in the exemplary illustrative implementation, other forms of field-of-view, magnification and imaging process could be used instead or in addition. While ultrasonic sensors are used to sense object configuration and dimensions, other technology such as laser scanners, pressure mats, etc. could be used instead or in addition. While the exemplary illustrative non-limiting implementation uses an enclosure to control the lighting and background environment, other techniques could be used instead. The invention is intended to be defined by the claims and to cover all corresponding and equivalent arrangements whether or not specifically disclosed herein.

We claim:

1. A method for automatically capturing one or multiple images of a motor vehicle comprising:
    moving said motor vehicle into an enclosure;
    tracking the motor vehicle as it moves into the enclosure;
    in response to said tracking, automatically closing at least one entry door to provide a controlled environment within the enclosure;
    automatically measuring the length of said motor vehicle;
    automatically adjusting the amount of zoom of plural cameras at least in part in response to said measured length; and
    automatically capturing multiple images of said motor vehicle using said plural cameras with said adjusted amount of zoom.

2. The method of claim 1 further including ultrasonically sensing the length of said motor vehicle and using said sensed length to at least in part control image field of view.

3. The method of claim 1 further including providing illumination based on automatically controlling high energy lamps within said enclosure.

4. The method of claim 1 further including positioning a portable handheld computing device within said vehicle during image capture.

5. The method of claim 4 further including using said portable computing device to capture an interior image within said vehicle.

6. The method of claim 1 further including uploading an image capture file including multiple images to a web server for distribution over a data communications network.

7. A vehicle photo booth comprising:
    an enclosure having automatic ambient light obstructers at each end thereof;
    high intensity lamps disposed within said enclosure;
    multiple digital cameras aimed from different angles and having zoom control disposed within said enclosure;
    at least one spatial object sensing device disposed within said enclosure, said spatial object sensing device sensing and measuring at least one dimension of an object disposed within said enclosure; and
    a computer controller coupled to said ambient light obstructers, said high intensity lamps, said multiple digital cameras and said spatial object sensing device, said computer controller automatically controlling said doors, said lamps and said multiple digital cameras, said computer controller automatically controlling the amount of zoom of said plural cameras by acting on said multiple camera zoom control at least in part in response to said dimension measured by said spatial object sensing device.

8. The system of claim 7 wherein said system further includes a bar code scanner coupled to said computer controller.

9. The system of claim 7 further including a portable handheld unit in wireless communication with said computer controller, said handheld unit providing an operator display.

10. The system of claim 9 wherein said handheld unit provides a portable camera.

11. The system of claim 9 wherein said handheld unit provides at least one control operable by a human to indicate approval of captured images.

12. The system of claim 9 wherein said handheld unit is used by said operator to capture additional images at the operator's discretion.

13. The system of claim 7 wherein said computer controller associates images with prestored downloaded information pertaining to an object being photographed.

14. The system of claim 7 wherein said computer controller communicates with a remote server a data communications network.

15. The system of claim 7 wherein said enclosure provides interior walls painted a uniform color.

16. An image capture system comprising:
    means for selectively preventing ambient light from reaching a car;
    means for lighting said car;
    means for sensing the position and measuring at least one dimension of said car; and
    means coupled to said sensing means for automatically controlling the amount of zoom applied by of a plurality of digital cameras aimed at said car from different angles in response to said measured car dimension.

* * * * *